US008992720B2

(12) United States Patent
Bharti et al.

(10) Patent No.: US 8,992,720 B2
(45) Date of Patent: Mar. 31, 2015

(54) PRESSURE SENSITIVE ADHESIVE COMPRISING FUNCTIONALIZED POLYISOBUTYLENE HYDROGEN BONDED TO ACYLIC POLYMER

(75) Inventors: Vivek Bharti, Cottage Grove, MN (US); Guy D. Joly, Shoreview, MN (US); Shujun Wang, St. Paul, MN (US); Peiwang Zhu, Woodbury, MN (US); Babu N. Gaddam, Woodbury, MN (US); Sanat Mohanty, Woodbury, MN (US); Jingjing Ma, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 359 days.

(21) Appl. No.: 13/499,922

(22) PCT Filed: Nov. 15, 2010

(86) PCT No.: PCT/US2010/056648
§ 371 (c)(1),
(2), (4) Date: Apr. 3, 2012

(87) PCT Pub. No.: WO2011/062852
PCT Pub. Date: May 26, 2011

(65) Prior Publication Data
US 2012/0285618 A1    Nov. 15, 2012

Related U.S. Application Data

(60) Provisional application No. 61/262,613, filed on Nov. 19, 2009.

(51) Int. Cl.
*B32B 7/12*      (2006.01)
*C09J 123/22*    (2006.01)
*C09J 7/02*      (2006.01)
*C08L 23/22*     (2006.01)
*C08L 33/08*     (2006.01)

(52) U.S. Cl.
CPC ............... *C09J 123/22* (2013.01); *C08L 23/22* (2013.01); *C08L 33/08* (2013.01); *C09J 7/0275* (2013.01); *C09J 2421/00* (2013.01); *C09J 2423/00* (2013.01)
USPC ........ 156/331.6; 156/237; 156/241; 156/278; 264/129; 428/355 CN; 524/521; 525/217

(58) Field of Classification Search
USPC .............. 156/331.6, 237, 241, 278; 524/521; 525/217; 264/129; 428/355 CN
See application file for complete search history.

(56) References Cited

U.S. PATENT DOCUMENTS

| 5,171,760 A | 12/1992 | Kaszas |
| 5,397,837 A | 3/1995 | Arjunan |
| 5,665,823 A | 9/1997 | Saxena |
| 6,054,549 A | 4/2000 | Bahadur |
| 6,063,838 A | 5/2000 | Patnode |
| 6,221,383 B1 | 4/2001 | Miranda |
| 6,497,949 B1 | 12/2002 | Hyde |
| 6,630,238 B2 | 10/2003 | Hyde |
| 6,632,522 B1 | 10/2003 | Hyde |
| 6,642,298 B2 | 11/2003 | Foreman |
| 6,670,417 B2 | 12/2003 | Foreman |
| 6,893,718 B2 | 5/2005 | Melancon |
| 7,932,316 B2 | 4/2011 | Yan et al. |
| 2004/0260007 A1 | 12/2004 | Yamaguchi |
| 2007/0281151 A1 | 12/2007 | Schocker |
| 2009/0026934 A1 | 1/2009 | Fujita |
| 2010/0080990 A1 | 4/2010 | Shirai |
| 2010/0227969 A1 | 9/2010 | Zhu |
| 2011/0073901 A1 | 3/2011 | Fujita |
| 2011/0104486 A1 | 5/2011 | Ma |
| 2011/0105637 A1 | 5/2011 | Fujita |
| 2011/0282010 A1 | 11/2011 | Fujita |
| 2012/0064304 A1 | 3/2012 | Bharti |

FOREIGN PATENT DOCUMENTS

| EP | 0519278 | 12/1999 |
| EP | 1862520 | 12/2007 |
| EP | 2133396 | 12/2009 |
| JP | 06-322342 | 11/1994 |
| JP | 10-158618 | 6/1998 |
| JP | 10204401 A | * 8/1998 |
| JP | 10-298522 | 11/1998 |
| JP | 2000-178528 | 6/2000 |
| WO | WO 03/072654 | 9/2003 |

(Continued)

OTHER PUBLICATIONS

JPO machine translation of JP 10-204401, retrieved Jan. 8, 2015.*
JPO machine translation of JP 10-158618, retrieved Jan. 8, 2015.*
Research Development of Hydrogen Bond in Polymer Blending Material, Li Zhonguhan et al., Chemical Development, vol. 27, No. 8, pp. 1162-1169.
International Search Report PCT/US2010/056648, Mar. 22, 2011, 4 pgs.
Glissopal® 1000, 1300 and 2300 Technical Information, BASF the Chemical Company, Dec. 2005, 8 pgs.
Oppanol® B Types, Range Chart, BASF the Chemical Company, Oct. 2005, 3 pages.

(Continued)

*Primary Examiner* — Timothy Kennedy
(74) *Attorney, Agent, or Firm* — Carolyn A. Fischer

(57) ABSTRACT

A pressure sensitive adhesive composition is described comprising a polyisobutylene polymer having a first functional group and an acrylic polymer having a second functional group present in the acrylic polymer backbone. The first and second functional groups form a hydrogen bond. In some embodiments, the adhesive composition further comprises a crosslinker that covalently crosslinks the second functional group(s) present in the polymer backbone of the acrylic polymer. Also described are adhesive articles, such as a tape, methods of adhesively bonding, and methods of making a pressure sensitive adhesive.

18 Claims, No Drawings

(56) References Cited

FOREIGN PATENT DOCUMENTS

| | | |
|---|---|---|
| WO | WO 2006/093702 | 9/2006 |
| WO | WO 2007/087281 | 8/2007 |
| WO | WO 2008/066914 | 6/2008 |
| WO | WO 2008/129852 | 10/2008 |
| WO | WO 2011/017298 | 2/2011 |
| WO | WO 2011/062851 | 5/2011 |
| WO | WO 2012/082448 | 6/2012 |

OTHER PUBLICATIONS

Puskas et al., "New Polyisobutylene-based UV-curable flexible coatings", Polymer Bulletin 20, 253-260 (1988).

Tripathy et al., "Syntheses Characterization of Polyisobutylene Macromonomers with Methacrylate, Acrylate, Glycidyl Ether, or Vinyl Ether End-Functionality", Macromolecules 2009, 42, 3958-3964.

Fang et al., Novel Block Ionomers. III. Mechanical and Rheological Properties, Journal of Polymer Science, vol. 88, 1516-1525 (2003).

Kuo, "Hydrogen-bonding in polymer blends", J. Polym. Res. (2008) 15:459-486.

Kerocom® PIBSI Technical Information BASF Mar. 2004, 2 pgs.

Glissopal® SA, Intermediate for mineral oil additives and emulsifiers, Technical Information BASF Sep. 2003, 2 pgs.

Kerocom® PIBA03, Gasoline Additive Component Technical Data Sheet (2003) 1 page.

Muller et al., "Junction Dynamics in Telechelic Hydrogen Bonded Polyisobutylene Networks", Macromolecules 1996, 29, 2577-2583.

Binder et al., "Tunable Materials from Hydrogen-Bonded Pseudo Block Copolymers", Advanced Materials, 2005, 17, 2824-2828.

Material Datasheet "Quadrant EPP Proteus® Natural Homopolymer Polypropylene" [printed from the internet on Oct. 20, 2009] <http://quadrant.matweb.com/SpecificMaterialPrint.asp?bassnum=p1smp48>, 1 page.

Material Datasheet "Quadrant EPP HDPE—High Density Polyethylene", [printed from the internet on Oct. 20, 2009] <http://quadrant.matweb.com/SpecificMaterialPrint.asp?bassnum=p1smp33>, 1 page.

Material Datasheet "Quadrant EPP LDPE—Natural Low Density Polyethylene", [printed from the internet on Oct. 20, 2009] <http://quadrant.matweb.com/SpecificMaterialPrint.asp?bassnum=p1smp42>, 1 page.

SABIC Innovative Plastics™ Lexan 9034 Sheet Product Datasheet, 1 page, undated.

Plexiglas® MC Acrylic Sheet, Jan. 2009, 1 page.

\* cited by examiner

PRESSURE SENSITIVE ADHESIVE COMPRISING FUNCTIONALIZED POLYISOBUTYLENE HYDROGEN BONDED TO ACYLIC POLYMER

CROSS REFERENCE TO RELATED APPLICATIONS

This application is a national stage filing under 35 U.S.C. 371 of PCT/US2010/056648, filed Nov. 15, 2010, which claims priority to U.S. Provisional Application No. 61/262613, filed Nov. 19, 2009, the disclosure of which is incorporated by reference in their entirety herein.

BACKGROUND

Pressure sensitive adhesives (PSAs) are an important class of materials.

In recent years, there has been a significant increase in the use of plastics, vulcanized rubbers, and thermoplastic vulcanizates ("TPV") in the automotive, appliance and electronics markets. Generally, these materials combine the desirable characteristics of vulcanized rubber with the processing ease of thermoplastics. However, bonding to these and other low surface energy substrates currently requires priming the substrate surface prior to bonding with a pressure sensitive adhesive ("PSA"). The priming process can be expensive and labor intensive, and may present environmental concerns.

Accordingly, industry would find advantage in new pressure sensitive adhesives that can exhibit good adhesion to a variety of substrates, such as low surface energy substrates.

SUMMARY

In one embodiment, a pressure sensitive adhesive composition is described comprising a polyisobutylene polymer having a first functional group and an acrylic polymer having a second functional group present in the acrylic polymer backbone. The first and second functional groups form a hydrogen bond. In some embodiments, the adhesive composition further comprises a crosslinker that covalently crosslinks the second functional group(s) present in the polymer backbone of the acrylic polymer.

In another embodiment, a pressure sensitive adhesive coated article is described, such as a tape. The article comprises a substrate and the pressure sensitive adhesive described herein coated on at least one surface of the substrate.

In another embodiment, a method of bonding is described comprising providing a substrate, applying the adhesive on a surface of the substrate, and contacting the pressure sensitive adhesive with another substrate.

In another embodiment, a method of making a pressure sensitive adhesive is described. The method comprises blending a polyisobutylene polymer having a first functional group; and an acrylic polymer having a second functional group present in the polymer backbone; wherein the first and second functional groups form a hydrogen bond.

DETAILED DESCRIPTION

As used in the art, the term "pressure-sensitive adhesive" refers to adhesive compositions that have (1) aggressive and persistent tack, (2) adherence with no more than finger pressure, (3) sufficient ability to hold onto an adherend, and (4) sufficient cohesive strength to be cleanly removable from the adherend.

The pressure sensitive adhesive composition described herein comprises at least one polyisobutylene (PIB) polymer having a first functional group, also referred to herein as the "functionalized polyisobutylene". The first functional group is typically a terminal group. The first functional group can form a hydrogen bond to (e.g. pendant carboxylic acid groups of) the backbone of an acrylic polymer or a functional group appended to the (e.g. backbone) of the acrylic polymer.

In some embodiments, the functionalized polyisobutylene polymer is a functionalized homopolymer of isobutylene. In other embodiments, the functionalized polyisobutylene polymer may be a copolymer comprising isobutylene repeat units and a small amount of units derived from another monomer such as, for example, styrene, isoprene, butene, or butadiene. These copolymers are typically prepared from a monomer mixture that includes at least 70 weight percent, at least 75 weight percent, at least 80 weight percent, at least 85 weight percent, at least 90 weight percent, or at least 95 weight percent isobutylene based on the weight of monomers in the monomer mixture. Typically, at least 70 weight percent, at least 75 weight percent, at least 80 weight percent, at least 85 weight percent, or at least 90 weight percent of the polyisobutylene copolymer is formed from isobutylene repeat units. Exemplary copolymers include isobutylene copolymerized with isoprene.

The functionalized polyisobutylene is typically a liquid polymer having a relatively low to intermediate number average ($M_n$) molecular weight. The $M_n$ is typically at least 500 g/mole, 750 g/mole, or about 1,000 g/mole. In some embodiments, the $M_n$ of the functionalized polyisobutylene is no greater than 25,000 g/mole, or 10,000 g/mole, or 5,000 g/mole.

The functionalized polyisobutylene typically has a glass transition temperature of no greater than about $-30°$ C. or less, no greater than about $-50°$ C., or no greater than about $-70°$ C., as determined by differential scanning calorimetry (DSC).

The functional group of the functionalized polyisobutylene can be any functional group that forms a hydrogen bond with (e.g. pendant carboxylic acid groups of) the backbone of an acrylic polymer or a functional group appended to the (e.g. backbone) of the acrylic polymer. The predominant bond between the functional group of the polyisobutylene and the acrylic polymer is a hydrogen bond. Hence, such functional groups do not form a covalent bond. A hydrogen bond is an attractive force, or bridge, occurring in polar compounds in which a hydrogen atom of one molecule or functional group is attracted to unshared electrons of another. The hydrogen atom is the positive end of one polar molecule or functional group (otherwise known as a hydrogen bond donor) and forms a linkage with the electronegative end of another molecule or functional group (otherwise known as a hydrogen bond acceptor). Functional groups that have non-polar covalent bonds do not form hydrogen bonds.

Common hydrogen-bond donors include carboxylic acids, phosphonic acids, phosphoric acid esters, sulfonic acids, sulfinic acids, alcohols, and phenols.

Common hydrogen-bond acceptors include nitrogen containing groups such as amines, amides, imines, imides, nitriles and ureas as well as aromatic nitrogen-based functional groups such as pyridines, imidazoles, etc. Other hydrogen-bond acceptors include carboxylate groups (carboxylic acid, carboxylic ester), phosphonates, sulfoxides, sulfones, and carbamates.

In one embodiment, the acrylic polymer has carboxylic acid functionality and the functionalized PIB has a functional (e.g. terminal) group that hydrogen bonds with the carboxylic acid group of the acrylic polymer or a functional group appended to the (e.g. backbone) of the acrylic polymer.

In this embodiment, the functional group of the functionalized PIB is not acrylate, methacrylate, or any other functional group that covalently bonds with a (meth)acrylate group via a free radical polymerization. This approach can be preferred since it can utilize commercially available functionalized PIB having a terminal nitrogen containing group such as an amine or imide.

Various functionalized PIB materials are commercially available. For example, polyisobutyleneamine ($M_n$) of about 1,000 grams/mole and a molar mass distribution $M_w/M_n$=1.6) is commercially available from BASF Corporation (Florham Park, N.J.) under the trade designation "Kerocom® PIBA03". Further, polyisobutene succinimide is available from BASF under the trade designation "Kerocom® PIBSI". An anhydride-terminated polyisobutylene ($M_n$) of about 1,000 grams/mole) is available from BASF under the trade designation "Glissopal SA".

The commercially available functionalized PIB materials are suitable for the formation of hydrogen bonds wherein the carboxylic acid group is the proton donor (i.e. H-bond donor) and the nitrogen-containing group (i.e. amine or imide) is the proton acceptor (i.e. H-bond acceptor).

However, it is appreciated that the functional groups can be reversed. For example, the functionalized PIB may have a (e.g. terminal) carboxylic acid group, provided that the carboxylic acid groups of the acrylic polymer are pre-reacted to convert these groups to a functional group that will then in turn form a hydrogen bond with the carboxylic acid groups of the PIB.

For example, polyisobutyleneamine (e.g. Kerocom® PIBA03) could be reacted with an anhydride (such as succinic anhydride or glutaric anhydride) to provide a carboxylic acid-functionalized PIB material. A carboxylic acid-functionalized PIB could also be prepared by reaction of anhydride-terminated polyisobutylene (e.g. Glissopal SA) with an alcohol (such as 1-octanol) to provide a PIB chain terminated with an ester and a carboxylic acid.

Amine-functionalized acrylic polymers can be prepared by copolymerization of at least one amino comonomer with alkyl(meth)acrylate monomers. Suitable amino comonomers are olefinically unsaturated, polymerizable compounds that contain at least one primary or secondary amino group, e.g. amino methacrylates such as tert-butylaminoethyl methacrylate or meta-isopropenyl-α,α-dimethylbenzylamine. Amino groups can also be obtained by the reaction of acid polymers with aziridines such as ethylene imine, as well as other techniques known for adding amine functionality to polymers.

Various amino comomomers are known including for example N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS),4-(N,N-dimethylamino)-styrene (DEAS)), and mixtures thereof.

Other functionalized polyisobutylenes can be prepared by various methods as known in the art. For example, hydroxy-functionalized PIBs could also be synthesized by reacting anhydride-terminated polyisobutylene (e.g. Glissopal SA) with amino alcohols or diols, or by reacting polyisobutylene-amine (e.g. Kerocom® PIBA03) with 2-chloroethanol or epoxides. Pyridine-functionalized PIB-based materials can be synthesized by reacting an amino or hydroxy-bearing pyridine compound with a polyisobutylene (e.g. succinic) anhydride (e.g. Glissopal® SA). Alternatively, polyisobutylene-amine (e.g. Kerocom®PIBA03) can be reacted with 3-(chloromethyl)pyridine to provide a pyridyl-substituted PIB derivative. Carbamate-functionalized PIB could be obtained by reacting poly-isobutyleneamine (e.g. Kerocom® PIBA03) with isocyanate electrophiles.

The presence and concentration of functional groups within a functionalized PIB material can be determined by Proton Nuclear Magnetic Resonance. Typically, the functionalized PIB material comprises at least 3 mol-% of functional groups. The concentration of functional groups is generally no greater than 10 mol-%. The amount of functionalized PIB material in the pressure sensitive adhesive composition can vary depending on the desired end use of the adhesive composition. Typically, however, the concentration of functionalized PIB material is at least 2 wt-%, or 5 wt-%, or 10 wt-% in order to improve adhesion with low surface energy substrates such as those prepared from polyolefins. The concentration of functionalized PIB material may range up to 40 wt-%, or 50 wt-%, or 60 wt-%. Particularly when the pressure sensitive adhesive composition is also intended for use with higher surface energy substrates, the concentration of functionalized PIB material is typically 40 wt-% to 60 wt-%, when utilizing a functionalized PIB material having a relatively low molecular weight (e.g. $M_n$ less than 10,000 g/mole).

The pressure sensitive adhesive composition described herein further comprises at least one acrylic polymer. The acrylic polymer generally comprises the reaction product of at least one alkyl(meth)acrylate and at least one comonomer, most commonly a carboxylic acid, that provides functional groups along the backbone of the acrylic polymer. In some embodiments, the acrylic copolymer of the adhesive composition comprises at least about 70 wt-%, in some embodiments, at least about 80 wt-%, at least about 90 wt-%, at least about 95 wt-%, or even about 98 wt-% of at least one alkyl (meth)acrylate.

In some embodiments, the alkyl(meth)acrylate contains 4 to 20 carbon atoms, e.g., 4 to 8 carbon atoms. Exemplary alkyl(meth)acrylate include isooctyl acrylate (IOA), 2-octyl acrylate (2-OA), 2-ethylhexyl acrylate (2-EHA), butyl acrylate (BA), isobornyl acrylate (IBA), and combinations thereof. In some embodiments, the acrylic copolymer utilized in the PSA comprises at least two of such alkyl(meth)acrylates such as isooctyl acrylate and isobornyl acrylate.

In some embodiments, acrylic copolymer of the adhesive composition comprises no greater than 10 parts of comonomer, such as carboxylic acid. Since the comonomer typically provides the functional groups that compliment the functionality of the polyisobutylene, the concentration of comonomer is typically at least 0.5, 1, 2, 3, 4, or 5 wt-%. Exemplary comonomers include carboxylic acids such as acrylic acid or methacrylic acid.

In some embodiments, a comonomer (e.g. (meth)acrylate acid) concentration of 5 wt-% to 10 wt-% or 15 wt-% provides increased cohesive strength, as evident by the shear values.

The amount of acrylic polymer in the pressure sensitive adhesive composition can vary depending on the desired end use of the adhesive composition. Typically, however, the concentration of acrylic polymer is at least 20 wt-% or 25-wt-%. The concentration of acrylic polymer may range up to 50 wt-% or 60 wt-%. Particularly when the pressure sensitive adhesive composition is also intended for use with both low and higher surface energy substrates, the concentration of acrylic polymer typically ranges from 40 wt-% to 60 wt-%, when utilizing a functionalized PIB material having a relatively low molecular weight (e.g. $M_n$ less than 10,000 g/mole).

In some embodiments, the alkyl(meth)acrylate monomer(s) and functionalizing comonomer(s) are prepolymerized into an acrylic polymer and then combined with the functionalized PIB.

In other embodiments, the alkyl(meth)acrylate monomer(s) and functionalizing comonomer(s) are combined with the functionalized PIB and then the monomers are polymerized. The alkyl(meth)acrylate monomers and functionalized PIB can be polymerized by use of a thermal initiator or photoinitiator. The thermal initiator is often a peroxide, hydroperoxide, or azo compound. Alternatively, the alkyl (meth)acrylate monomers can be polymerized using ultraviolet radiation by use of an alpha-cleavage type photoinitiator including but not limited to benzoin or benzoin alkyl ethers. Since the functionalized PIB lacks functional groups that covalently copolymerize with the alkyl (meth)acrylate monomer(s) and functionalizing monomer(s), either method of preparation results in a composition comprising a blend of functionalized polyisobutylene polymer and acrylic polymer wherein the polyisobutylene polymer is hydrogen bonded to the functional groups along the backbone of the acrylic polymer.

The reaction product of the functionalized PIB and the acrylic polymer can be represented as follows, wherein Z represents a hydrogen-bond between complimentary functional groups:

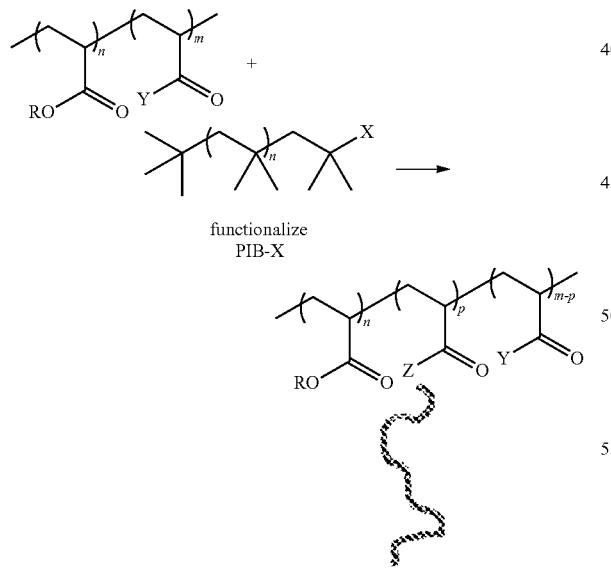

In some embodiments, the adhesive may comprise solely the functionalized PIB hydrogen bonded to the acrylic polymer, in the absence of crosslinker or any other optional components.

In other embodiments, the adhesives of the present disclosure may be crosslinked to improve their mechanical properties. In many embodiments, chemical crosslinking is preferred to improve the cohesive strength (as indicated by the static shear) of the pressure sensitive adhesive. For example, the adhesive may comprise a chemical crosslinker that is suitable for crosslinking the (e.g. carboxylic acid) functional groups of the acrylic polymer with each other. Suitable crosslinkers are known in the art such as aziridine or bisaziridine crosslinkers. One suitable bisaziridine crosslinker is prepared as described in U.S. Provisional Application No. 61/158,485, filed Mar. 9, 2009 (Peiwang Zhu et al. AZIRIDINE CROSSLINKING AGENTS FOR ACRYLIC ADHESIVES).

When the pressure sensitive adhesive (e.g. precursor) further comprises a chemical crosslinker, the reaction product of the functionalized PIB and the acrylic polymer can be represented as follows:

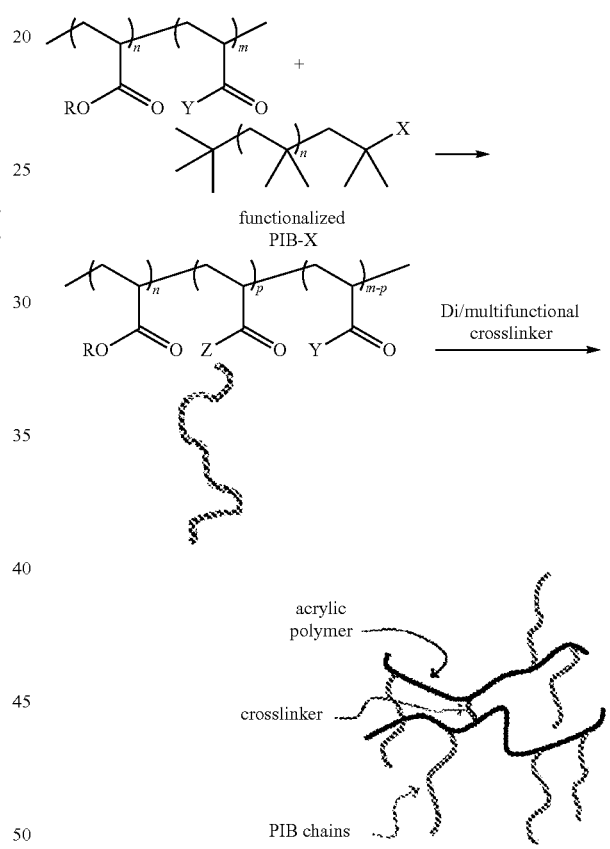

When present, the concentration of chemical crosslinker in the pressure sensitive adhesive composition is typically at least 0.025 wt-% and no greater than 2 wt-%.

In some embodiments, the adhesive further comprises at least one unfunctionalized (e.g. PIB) synthetic rubber material. The unfunctionalized (e.g. PIB) synthetic rubber material typically has substantially higher molecular weight than the functionalized (e.g. PIB) polyisobutylene material. In some embodiments, the weight average molecular weight ($M_w$) of the unfunctionalized (e.g. PIB) synthetic rubber material is at least 75,000 grams per mole, at least 100,000 grams per mole, e.g., at least 250,000 grams per mole, at least 500,000 grams per mole, or even at least 1,000,000 grams per mole. The weight average molecular weight is typically no greater than 4,000,000 g/mole.

The unfunctionalized (e.g. PIB) synthetic rubber material can be a homopolymer, copolymer, or a mixture thereof. Copolymers can be random or block copolymers. Block copolymers can include the polyisobutylene sections in the main backbone, in a side chain, or in both the main backbone and a side chain of the polymeric material. The polyisobutylene material is typically prepared by polymerizing isobutylene alone or by polymerizing isobutylene plus additional ethylenically unsaturated monomers in the presence of a Lewis Acid catalyst such as aluminum chloride, boron trichloride (with titanium tetrachloride as a cocatalyst), or boron trifluoride.

Unfunctionalized polyisobutylene materials are commercially available from several manufacturers. Homopolymers are commercially available, for example, under the trade designation OPPANOL (e.g., OPPANOL B10, B15, B30, B50, B100, B150, and B200) from BASF Corp. (Florham Park, N.J.). These polymers often have a weight average molecular weight ($M_w$) in the range of about 40,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN have a viscosity average molecular weight in the range of about 480,000 to about 4,000,000 grams per mole. Homopolymers commercially available from UCP under the trade designation JHY have a viscosity average molecular weight ($M_v$) in the range of about 3000 to about 55,000 grams per mole. These homopolymers typically do not have reactive double bonds. It is appreciated that the unfunctionalized (e.g. PIB) synthetic rubber may have a very small concentration of reactive double bonds or other functional groups that are residual to the polymerization thereof. The concentration of such reactive double bonds or other functional groups is typically less than 5, 4, 3, or 2 mol %. Such olefinic unsaturations are generally non-polar and thus not suitable functional groups for the formation of hydrogen bonds.

When present, the concentration of unfunctionalized (e.g. PIB) synthetic rubber material in the pressure sensitive adhesive composition is typically at least 5 wt-%, 10 wt-%, or 20 wt-% and no greater than 50 wt-% or 60 wt-%.

In some embodiments, the adhesive may comprise the functionalized (e.g. PIB) polyisobutylene hydrogen bonded to the acrylic polymer, optionally crosslinker, and an unfunctionalized low molecular weight polyisobutylene material. In some embodiments, the adhesive composition further comprises both a high molecular weight unfunctionalized (e.g. PIB) synthetic rubber and an unfunctionalized low molecular weight polyisobutylene materials. The low molecular weight (e.g. PIB) synthetic rubber materials are liquids at room temperature and can function as a plasticizer with a variety of elastomeric materials. Generally, such polyisobutylene materials have number average molecular weight of no greater than 10,000 g/mole, e.g., no greater than 5,000 g/mole, or even no greater than 2,000 g/mole. The number average molecular weight is typically at least about 500 g/mole or 1000 g/mole. The ratio of the weight average molecular weight to the number average molecular weight is typically in the range of about 1.6 to 2.0.

Exemplary low molecular weight polyisobutylene homopolymers are commercially available under the trade designation GLISSOPAL (e.g., GLISSOPAL 1000, 1300, and 2300) from BASF Corp. (Florham Park, N.J.). These polyisobutylene materials usually have terminal double bonds and are considered to be reactive polyisobutylene materials.

When present, the concentration of unfunctionalized low molecular weight polyisobutylene (e.g. PIB) material in the pressure sensitive adhesive is typically at least 5 wt-%, 10 wt-% or 20 wt-% and no greater than 30 wt-%.

In some embodiments, the adhesive may comprise the functionalized (e.g. PIB) polyisobutylene hydrogen bonded to the acrylic polymer, optionally crosslinker, optionally high/and or low molecular weight unfunctionalized (e.g. PIB) polyisobutylene materials, in the absence of any tackifier(s) or plasticizer(s). In other embodiments, the adhesive comprises at least one tackifier(s), plasticizer(s), or mixtures thereof.

The tackifier can have any suitable softening temperature or softening point. The softening temperature is often less than 200° C., less than 180° C., less than 160° C., less than 150° C., less than 125° C., or less than 120° C. In applications that tend to generate heat, however, the tackifier is often selected to have a softening point of at least 75° C. Such a softening point helps minimize separation of the tackifier from the rest of the adhesive composition when the adhesive composition is subjected to heat such as from an electronic device or component. The softening temperature is often selected to be at least 80° C., at least 85° C., at least 90° C., or at least 95° C. In applications that do not generate heat, however, the tackifier can have a softening point less than 75° C.

Exemplary tackifiers include hydrocarbon resins and hydrogenated hydrocarbon resins, e.g., hydrogenated cycloaliphatic resins, hydrogenated aromatic resins, or combinations thereof. Suitable tackifiers are commercially available and include, e.g., those available under the trade designation ARKON (e.g., ARKON P or ARKON M) from Arakawa Chemical Industries Co., Ltd. (Osaka, Japan); those available under the trade designation ESCOREZ (e.g., ESCOREZ 1315, 1310LC, 1304, 5300, 5320, 5340, 5380, 5400, 5415, 5600, 5615, 5637, and 5690) from Exxon Mobil Corporation, Houston, Tex.; and those available under the trade designation REGALREZ (e.g., REGALREZ 1085, 1094, 1126, 1139, 3102, and 6108) from Eastman Chemical, Kingsport, Tenn.

The concentration of tackifier can vary depending on the intended adhesive composition. In some embodiments, the amount of tackifier is at least 10 wt-% or 20 wt-%. The maximum amount of tackifier is typically no greater than 40 wt-%, 50 wt-%, or 60 wt-%.

Other optional additives can include, for example, initiators, ultraviolet absorbents (e.g., benzotriazole, oxazolic acid amide, benzophenone, or derivatives thereof), ultraviolet stabilizers (e.g., hindered amines or derivatives thereof, imidazole or derivatives thereof, phosphorous-based stabilizers, and sulfur ester-based stabilizers), antioxidants (e.g., hindered phenol compounds, phosphoric esters, or derivatives thereof). Exemplary antioxidants include those available from Ciba Specialty Chemicals Incorporated, Tarrytown, N.Y.

The adhesives of the present disclosure may be combined with a substrate to form any number of typical adhesive articles, e.g., single- and double-coated tapes, and laminating adhesives. Generally, laminating adhesives may comprise either a free film of adhesive or an adhesive film embedded with a support, e.g., a woven or non-woven scrim. Such products can be formed by applying (e.g., coating, casting, or extruding) the adhesive onto a release liner, and drying and/or curing the adhesive.

The adhesives of the present disclosure may also be applied to one or both sides of a substrate to form a single- or double-coated tape. Any know substrate, including single and multi-layer substrates comprising one or more of paper, polymeric film, and metal (e.g., metal foil) may be used. In some embodiments, one or more layers of the substrate may be foam. In some embodiments, one or both adhesive layers may be bonded directly to the substrate. In some embodiments, one or both adhesive layers may be indirectly bonded to the substrate. For example, in some embodiments, one or more intermediate layers (e.g., primer layers) may be interposed between the substrate and the adhesive layer.

The adhesive is useful for bonding to a variety of metal and polymeric materials. Metals typically have a surface energy of at least about 500 dynes/cm. For example stainless steel is reported to have a surface energy of about 700-1100 dynes/cm. Inorganic oxides generally have a surface energy less than that of metals. For example, glass is reported to have a surface energy of about 250-500 dynes/cm. The adhesive is particularly useful for bonding to various polymeric materials. Polymeric materials such as plastics generally have a surface energy of less than 100 dynes/cm, 75 dynes/cm, or 50 dynes/cm. For example, polyester is reported to have surface energy of 43 dynes/cm; polycarbonate 42 dynes/cm; polyvinyl chloride 39 dynes/cm; and acrylic 38 dynes/cm. Even lower surface energy materials have a surface energy of less than 37 dynes/cm. These include for example polyvinyl acetate, polystyrene, acetal, ethylene vinyl acetate, and polyethylene, reported to have a surface energy of 31 dynes/cm.

The pressure sensitive adhesive can exhibit various peel and shear properties, depending on the intended end use.

In some embodiments the 90 degree peel to glass, stainless steel, high density polyethylene (HDPE), polypropylene (PP), or EPDM is at least 5 oz/inch (5 N/dm) for a temporary removable or low temperature PSA. For masking tapes, the 90 degree peel to glass, stainless steel, HDPE, PP, or EPDM is typically 15-20 oz/inch (16-22 N/dm). In other embodiments the 90 degree peel to glass, stainless steel, HDPE, or PP is at least 50, 60, 70, 80 or 90 oz/inch (55, 66, 77, 88 or 99 N/dm). In at least some embodiments, the shear at room temperature (23° C.) is at least 300 minutes, 500 minutes, or 800 minutes. In some favored embodiments, the adhesive exhibits good adhesion to both high and low surface energy substrates. In such embodiments, the 90 degree peel to glass or stainless steel is at least 50, 60, 70, 80 or 90 oz/inch (55, 66, 77, 88 or 99 N/dm) in combination with the 90 degree peel to PP being at least 30, 40, 50, or 60 oz/inch. Further, the 90 degree peel to EPDM is typically at least 30, 40, or 50 oz/inch; whereas the 90 degree peel to HDPP is at least 30, 40, or 50 oz/inch. In some favored embodiment, the shear at room temperature (23° C.) or 70° C. is at least 2,000 minutes; 4,000 minutes; 8,000 minutes; or 10,000 minutes.

The following, non-limiting, examples further describe exemplary adhesives and adhesive articles of the present disclosure, as well as exemplary methods for making such adhesives and adhesive articles. All percents are by weight unless otherwise indicated.

Test Methods:

90° Angle Peel Adhesion Strength Test. Evaluation of peel adhesion strength at an angle of 90° was performed as described in the ASTM International standard, D3330, Method F, with a 1.3 cm×20 cm (½ in.×8 in.) test specimen using an IMASS SP-200 slip/peel tester (available from IMASS, Inc., Accord, Mass.) at a peel rate of 305 mm/minute (12 inches/minute). The samples were adhered to the test panels by rolling down the tapes with a 2.0 kg (4.5 lb.) rubber roller using 4 passes. The test panels included:

| Material | Description | Source |
|---|---|---|
| EPDM | Ethylene/propylene-diene class M rubber; having a durometer hardness of 60, measuring 5.1 × 12.7 × 0.15 cm (2 × 5 × 0.059 in.); available as EPDM, Part No. RZW07-015 | Zatkoff Seals & Packings, Warren, MI |
| PP | Polypropylene (0.91 g/cc) (Quadrant EPP Proteus Natural Homopolymer Polypropylene); | |
| Stainless Steel | SS, 304, 18 gauge stainless steel, bright annealed finish. | ChemInstruments, Incorporated, Fairfield, OH |
| HDPE | 2" × 5", 0.2" thick, 0.96 g/cc high density polyethylene (Quadrant EPP HDPE) | obtained from Aeromat Plastics Inc., Burnsville, MN |
| Glass | 6" × 6", ¼" float glass | |

The test panels were cleaned with a 1:1 isopropyl alcohol/water mixture and thoroughly dried prior to use. The peel tests were performed after a 15 min dwell time in a controlled environment room on the test panel, unless otherwise stated. The average peel adhesion force required to remove the tape from the panel was measured in ounces and is expressed in Oz/inch, based on 2 test samples.

Static Shear Strength at 23° C./50% Relative Humidity: Evaluation of static shear strength was performed as described in the ASTM International standard, D3654, Procedure A, with a 1.3 cm×2.5 cm (½ in.×1 in.) test specimen and a 1000 g load. The test panels were stainless steel ("SS"). Time to failure in minutes was recorded. If no failure was observed after 10,000 minutes, the test was stopped and a value of >10,000 minutes was recorded.

Static Shear Strength at 70° C.: Evaluation of static shear strength was performed as described in the ASTM International standard, D3654, Procedure A, with a 1.3 cm×2.5 cm (½ in.×1 in.) test specimen and a 500 g load. The test panels were stainless steel ("SS"). Time to failure in minutes was recorded. If no failure was observed after 10,000 minutes, the test was stopped and a value of >10,000 minutes was recorded.

Materials

| Material | Abbreviation | Function | Manufacturer |
|---|---|---|---|
| Polyisobutylene (High MW 1000K g/mol) | B100 | Unfunctionalized Synthetic Rubber | BASF |
| Polyisobutylene (Medium MW 500K g/mol) | B268 | Unfunctionalized Synthetic Rubber | Exxon |
| Polyisobutylene (Low MW 1000 g/mol) | G1000 | Unfunctionalized Polyisobutylene | BASF |
| Kerocom ® PIBA03 (~1000 g/mol of amine-terminated PIB) | PIBA03 | Functionalized Polyisobutylene | BASF |
| Acrylic copolymer of isooctyl acrylate and acrylic acid | IOA/AA | | |
| Isobornyl acrylate | IBA | | |
| Isooctyl acrylate | IOA | | |
| Foral 85 ™ | F85 | Tackifier | Eastman |
| Eastotac 1310 ™ | E1310 | Tackifier | Eastman |
| Regalrez ™ 6108 | | Tackifier | Eastman |
| Crosslinker | | The bisaziridine crosslinker utilized in the examples was prepared according to 3M patent application No. 61/158,485, filed Mar. 9, 2009) | |
| Crosslinker 2 | | 1,1'-isophthaloyl-bis(2-methylaziridine) crosslinker (CAS No. 7652-64-4) as described in U.S. Pat. No. 6,893,718. | |

Substrates

| Silphan S36 M74A | release liner | Siliconature |
| --- | --- | --- |
| Hostaphan ® 3SAB | polyester film | Mitsubishi Polyester Film, Inc |

General Procedures. All reactions were performed in round-bottomed flasks or glass jars/vials using commercial reagents as received.

General Procedure for the Preparation of PIB-Acrylate Blends and Adhesive Films for Examples 1-10: Kerocom® PIBA03 (1.00 g) was added to a 20 mL glass vial. Next, the isooctyl acrylate/acrylic acid copolymer as described in the table (e.g. 98:2 isooctyl acrylate:acrylic acid, 3.5 g of a 23 wt % solution in ethyl acetate, 0.805 g solids) was added. The materials were mixed well and the mixture became more viscous. Tackifier (e.g. E1310) (1.00 g) and toluene (3.0 mL) were added and the formulation was mixed until homogeneous. Bisaziridine crosslinker (0.300 g of a 15 wt % solution in toluene) was added and the formulation was again mixed well. A hand spread was pulled onto a PET liner (Mitsubishi 3SAB) using a 10 mil gap. The film was dried in an oven at 120° C. for 45 minutes. Next, the adhesive film was allowed to cool to room temperature and a release liner (Silphan S36 M74A) was laminated to the top. The adhesive film was 0.0019" thick.

Pressure Sensitive Adhesive Compositions

| | Formulation | Wt-% solids |
| --- | --- | --- |
| Example 1 | PIBA03 | 55.4 |
| | Acrylic Copolymer (98:02 IOA/AA, 26% solids in EtOAc/Heptane) | 44.6 |
| | E1310 | 0.0 |
| | Crosslinker (15 wt % in toluene) | 0.0 |
| Example 2 | PIBA03 | 55.4 |
| | Acrylic Copolymer (94:06 IOA/AA, 45% solids in EtOAc/Heptane) | 44.6 |
| | E1310 | 0.0 |
| | Crosslinker (15 wt % in toluene) | 0.0 |
| Example 3 | PIBA03 | 55.1 |
| | Acrylic Copolymer (98:02 IOA/AA, 26% solids in EtOAc/Heptane) | 44.6 |
| | E1310 | 0.0 |
| | Crosslinker (15 wt % in toluene) | 0.5 |
| Example 4 | PIBA03 | 55.1 |
| | Acrylic Copolymer (94:06 IOA/AA, 45% solids in EtOAc/Heptane) | 44.6 |
| | E1310 | 0.0 |
| | Crosslinker (15 wt % in toluene) | 0.5 |
| Example 5 | PIBA03 | 40.7 |
| | Acrylic Copolymer (94:6 IOA/AA, 30% solids in EtOAc) | 26.2 |
| | E1310 | 32.5 |
| | Crosslinker (15 wt % in toluene) | 0.6 |
| Example 6 | PIBA03 | 45.1 |
| | Acrylic Copolymer (90:2 IOA/AA, 30% solids in EtOAc) | 24.2 |
| | E1310 | 30.2 |
| | Crosslinker (15 wt % in toluene) | 0.5 |
| Example 7 | PIBA03 | 49.0 |
| | Acrylic Copolymer (90:2 IOA/AA, 30% solids in EtOAc) | 22.5 |
| | E1310 | 27.9 |
| | Crosslinker (15 wt % in toluene) | 0.5 |
| Example 8 | PIBA03 | 35.1 |
| | Acrylic Copolymer (98:02 IOA/AA, 23% solids in EtOAc) | 28.2 |
| | E1310 | 35.1 |
| | Crosslinker (15 wt % in toluene) | 1.6 |
| Example 9 | PIBA03 | 35.4 |
| | Acrylic Copolymer (98:02 IOA/AA, 23% solids in EtOAc) | 28.5 |
| | E1310 | 35.4 |
| | Crosslinker (15 wt % in toluene) | 0.8 |
| Example 10 | PIBA03 | 35.1 |
| | Acrylic Copolymer (90:10 IOA/AA, 30% solids in EtOAc) | 28.2 |
| | E1310 | 35.1 |
| | Crosslinker (15 wt % in toluene) | 1.6 |

90 Degree Peel Results

| | Thickness (mil) | Substrates | Peel oz/inch (N/dm) |
| --- | --- | --- | --- |
| Example 1 | 1.2 | Glass | 11 (12) |
| | | SS | 15 (16) |
| | | HDPE | 7 (8) |
| Example 2 | 1.2 | Glass | 12 (13) |
| | | SS | 8 (9) |
| | | HDPE | 2 (2) |
| Example 3 | 1.2 | Glass | 10 (11) |
| | | SS | 13 (14) |
| | | HDPE | 10 (11) |
| Example 4 | 1.2 | Glass | 9 (10) |
| | | SS | 8 (9) |
| | | HDPE | 2 (2) |
| Example 5 | 2.5 | Glass | 92 (101) |
| | | SS | 87 (95) |
| | | HDPE | 58 (64) |
| Example 6 | 3.5 | Glass | 79 (86) |
| | | SS | 78 (85) |
| | | HDPE | 81 (89) |
| Example 7 | 3.5 | Glass | 68 (75) |
| | | SS | 70 (77) |
| | | HDPE | 69 (76) |
| Example 8 | 2.0 | HDPE | 36 (40) |
| Example 9 | 2.0 | HDPE | 92 (101) |
| Example 10 | 2.7 | HDPE | 14 (15) |

General Procedure for the Preparation of Acrylate Copolymers of Isooctyl Acrylate, Acrylic Acid, and Isobornyl Acrylate. Isooctyl acrylate (23.69 g), acrylic acid (1.50 g), isobornyl acrylate (4.81 g), and ethyl acetate (55.71 g) were added to a 16 ounce amber bottle. Vazo® 67 (0.060 g) was added and the mixture was mixed until homogeneous. The reaction was sparged with nitrogen for 25 minutes and then quickly sealed with a Teflon®-lined metal cap. The reaction was further sealed with Teflon® tape and electrical tape. The reaction was placed in a water bath/shaker at 65° C. and gently agitated. After 63 hours, the reaction was removed from the water bath and was allowed to cool to room temperature. A viscous solution of the acrylic polymer in ethyl acetate was obtained.

The acrylic polymer formed was utilized to prepare adhesive compositions using the same general procedure as described above.

| Example | | Substrate | 90 Degree Peel oz/in (N/dm) |
|---|---|---|---|
| Example 11 | IOA/IBOA/AA/Regalrez 6108/ Glissopal SA/Crosslinker 2 (59.6/12.0/0.6/13.8/13.0/1) | PP | 55 (60) |

Adhesive compositions further comprising unfunctionalized PIB were prepared according to the following procedure: Kerocom® PIBA03 was added to a glass vial. Next, the isooctyl acrylate/acrylic acid copolymer solution (e.g. 94:6 isooctyl acrylate:acrylic acid or 90:10 isooctyl acrylate:acrylic acid in a 35% wt % ethyl acetate solution) was added, followed by adding unfunctionalized PIB (in a 15 wt % toluene solution) with tackfier (e.g. E1310). Additional toluene was added to make the total solids concentration equal 35 wt %. The concentration of each component in the various formulations is illustrated in the tables. The components were mixed well by shaking until the solution turned translucent and the components were uniformly dispersed. Immediately before coating, bisaziridine crosslinker (a 15 wt % solution in toluene) was added and the formulation was again shaken and mixed well. A hand spread was pulled onto a silicone release liner (Silphan S36 M74A) using a 9 mill gap. The film was dried in an oven at 70° C. for 30 minutes. Next, the adhesive film was allowed to cool to room temperature. The adhesive film was 0.0019" thick. During the cohesion and adhesion strength testing, 2 mil (0.0020") thick anodized aluminum was laminated on the PSA tape as adhesive backing.

| Example | B100 | PIBA03 | Acrylic Copolymer IOA/AA (90:10) | Cross linker | Stainless Steel 90° Peel oz/in (N/dm) | PP 90° Peel oz/in (N/dm) | Shear @ R.T. (min)$^a$ |
|---|---|---|---|---|---|---|---|
| Control | 60 | 40 | 0 | 0 | 25 (27) | 24 (26) | 192 |
| Ex. 12 | 44.98 | 29.99 | 24.99 | 0.05 | 35 (38) | 23 (25) | 4891 |
| Ex. 13 | 29.97 | 19.98 | 49.95 | 0.10 | 40 (44) | 23 (25) | >10000 |
| Ex. 14 | 14.98 | 9.99 | 74.89 | 0.15 | 53 (58) | 17 (19) | 6721 |

| Example | B100 | B268 | PIBA03 | IOA/AA 90:10 | Cross-linker | E1310 | Stainless Steel 90° Peel oz/in (N/dm) | PP 90° Peel oz/in (N/dm) | Shear @ R.T. (min)$^a$ |
|---|---|---|---|---|---|---|---|---|---|
| Ex. 15 | 24.98 | 0.00 | 24.98 | 49.95 | 0.10 | 0.00 | 68 (74) | 31 (34) | >10000 |
| Ex. 16 | 0.00 | 29.97 | 19.98 | 49.95 | 0.10 | 0.00 | 63 (69) | 32 (35) | 5095 |
| Ex. 17 | 27.25 | 0.00 | 18.17 | 45.41 | 0.09 | 9.08 | 143 (157) | 48 (53) | >10000 |
| Ex. 18 | 23.06 | 0.00 | 15.37 | 38.43 | 0.08 | 23.06 | 90 (99) | 62 (68) | >10000 |
| Ex. 19 | 27.25 | 0.00 | 18.17 | 45.41 | 0.09 | 9.08$^b$ | 70 (77) | 52 (57) | >10000 |

$^a$Shear data were obtained using 0.5" × 1.0" strips on stainless steel with a 1000 g load. at room temperature around 30° C.
$^b$and 10 wt-% F85

| Example | B268 | PIBA03 | G1000 | IOA/AA (94:6) | Cross-linker | E1310 | F 85 |
|---|---|---|---|---|---|---|---|
| Ex. 20 | 33.33 | 11.11 | 22.22 | 0.00 | 0.00 | 33.33 | 0.00 |
| Ex. 21 | 21.41 | 7.14 | 14.28 | 35.69 | 0.07 | 21.41 | 0.00 |
| Ex. 22 | 18.74 | 6.25 | 12.49 | 31.23 | 0.06 | 18.74 | 12.49 |
| Ex. 23 | 15.37 | 5.38 | 9.99 | 46.11 | 0.09 | 23.06 | 0.00 |
| Ex. 24 | 13.32 | 4.66 | 8.66 | 39.97 | 0.08 | 19.98 | 13.32 |

| Example | Stainless Steel 90° Peel oz/in (N/dm) | PP 90° Peel oz/in (N/dm) | HDPE 90° Peel oz/in (N/dm) | EPDM 90° Peel oz/in (N/dm) | Shear @ R.T. (min)$^a$ | Shear @ 70° C. (min)$^a$ |
|---|---|---|---|---|---|---|
| Ex. 20 | 47 (51) | 53 (58) | 36 (39) | 33 (36) | 13 | 0 |
| Ex. 21 | 54 (59) | 39 (43) | 44 (48) | 22 (24) | >10000 | 634 |
| Ex. 22 | 47 (51) | 55 (60) | 27 (30) | 19 (21) | >10000 | 1784 |
| Ex. 23 | 70 (77) | 54 (59) | 42 (46) | 37 (40) | >10000 | >10000 |
| Ex. 24 | 40 (44) | 49 (54) | 50 (55) | 33 (36) | >10000 | >10000 |

What is claimed is:

1. A pressure sensitive adhesive composition comprising:
   2 to 60 wt-% of polyisobutylene polymer having a first amine functional group; and
   20 to 60 wt-% of acrylic polymer having a second functional group present in the acrylic polymer backbone;
   wherein the first and second functional groups form a hydrogen bond.

2. The pressure sensitive adhesive composition of claim 1 wherein the first or second functional group is a hydrogen bond acceptor and the other functional group is a hydrogen bond donor.

3. The pressure sensitive adhesive composition of claim 1 wherein the polyisobutylene has a number average molecular weight of less than 10,000 g/mole.

4. The pressure sensitive adhesive composition of claim 1 wherein the polyisobutylene has a number average molecular weight of less than 15,000 g/mole.

5. The pressure sensitive adhesive composition of claim 1 wherein the acrylic polymer is a copolymer of at least one alkyl(meth)acrylate and at least one carboxylic acid.

6. The pressure sensitive adhesive composition of claim 5 wherein the alkyl (meth)acrylate is a C4 to C20 alkyl (meth)acrylate.

7. The pressure sensitive adhesive composition of claim 5 wherein the alkyl (meth)acrylate is a C4 to C8 alkyl (meth)acrylate.

8. The pressure sensitive adhesive composition of claim 1 wherein the adhesive composition further comprises a chemical crosslinker that covalently crosslinks the second functional groups present in the polymer backbone of the acrylic polymer.

9. The pressure sensitive adhesive composition of claim 8 wherein the crosslinker is selected from an aziridine crosslinker.

10. The pressure sensitive adhesive composition of claim 1 wherein the composition further comprises unfunctionalized polyisobutylene.

11. The pressure sensitive adhesive composition of claim 10 wherein the unfunctionalized polyisobutylene has a weight average molecular weight ranging from about 75,000 g/mole to 4,000,000 g/mole.

12. The pressure sensitive adhesive composition of claim 10 wherein the composition comprises an unfunctionalized polyisobutylene having a number average molecular weight of less than 10,000 g/mole.

13. The pressure sensitive adhesive composition of claim 1 further comprising a tackifying resin, a plasticizer, or a mixture thereof.

14. An article comprising:
    a substrate; and
    the pressure sensitive adhesive of claim 1 coated on at least one surface of the substrate.

15. The article of claim 14 wherein the articles is a tape.

16. A method of bonding comprising:
    providing a substrate;
    applying the pressure sensitive adhesive of claim 1 on a surface of the substrate; and
    contacting the pressure sensitive adhesive with another substrate.

17. The method of claim 16 wherein at least one substrate has a surface energy of less than 37 dynes/cm.

18. A method of making a pressure sensitive adhesive comprising:
    blending 2 to 60 wt-% of a polyisobutylene having a first amine functional group; and
    20 to 60 wt-% of acrylic polymer having a second functional group present in the polymer backbone; wherein the first and second functional groups form a hydrogen bond.

* * * * *

UNITED STATES PATENT AND TRADEMARK OFFICE
CERTIFICATE OF CORRECTION

| | | |
|---|---|---|
| PATENT NO. | : 8,992,720 B2 | Page 1 of 1 |
| APPLICATION NO. | : 13/499922 | |
| DATED | : March 31, 2015 | |
| INVENTOR(S) | : Vivek Bharti | |

It is certified that error appears in the above-identified patent and that said Letters Patent is hereby corrected as shown below:

On the Title page, item (54) and in the Specification, line 4, Title, – delete "ACYLIC" and insert -- ACRYLIC --, therefor.

In the Specification

Column 3, Line 50 – delete "comomomers" and insert -- comonomers --, therefor.

Column 3, Line 66 – delete "(DMAS),4-(N,N" and insert -- (DMAS), 4-(N,N --, therefor.

Column 8, Line 11 – delete "high/and or" and insert -- high and/or --, therefor.

Column 10, Line 11 (Approx.) – delete "Incorported," and insert -- Incorporated, --, therefor.

Column 14, Line 1 – delete "tackfier" and insert -- tackifier --, therefor.

Signed and Sealed this
First Day of September, 2015

Michelle K. Lee
*Director of the United States Patent and Trademark Office*